United States Patent [19]
Chandler

[11] 4,297,614
[45] Oct. 27, 1981

[54] EMERGENCY LIGHTING SYSTEM
[75] Inventor: Edward A. Chandler, Montreal, Canada
[73] Assignee: Kaufel Group Ltd., Montreal, Canada
[21] Appl. No.: 129,696
[22] Filed: Mar. 12, 1980
[51] Int. Cl.³ .............................. H05B 37/00
[52] U.S. Cl. ........................ 315/86; 307/46; 307/66
[58] Field of Search ............ 315/86; 307/46, 48, 307/66

[56] References Cited
U.S. PATENT DOCUMENTS 3,925,772  12/1975  Miller et al. ............... 307/66
4,216,410  8/1980   Feldstein .................. 315/86

Primary Examiner—Harold A. Dixon
Attorney, Agent, or Firm—Fleit & Jacobson

[57] ABSTRACT

The invention relates to an emergency lighting unit which is used in association with an electric discharge lamp in a fixture. The lamp has a first input terminal and a second input terminal. The emergency lighting unit includes a transformer which has two closely coupled windings constituting the primary of the transformer and a secondary winding. First adjacent ends of the coupled windings constitute the input of the emergency lighting unit, and second adjacent ends of the coupled windings constitute the output terminals thereof. The input terminals are adapted to be connected to a source of ac power, and the output terminals are adapted to be connected to respective ones of the first and second input terminals of the lamp. A rectifier is connected across the output of the secondary winding, and a rechargeable battery is connected across the output of the rectifier to be recharged by the dc output thereof. An inverter is connected in parallel with the battery and adapted to convert the dc output of the battery to an ac signal. A transfer circuit senses the loss of ac power from the source of ac power and, upon sensing the loss, connects the inverter in circuit with the input terminals to provide energy to continue running the lamp.

6 Claims, 6 Drawing Figures

EMERGENCY LIGHTING SYSTEM

BACKGROUND OF INVENTION (a) Field of Invention

This invention relates to a novel design of an emergency lighting unit for providing emergency lighting from a lighting fixture employing an electric discharge lamp during periods when the normal electric power supply to the lighting fixture has failed. More specifically, the invention relates to such a novel design wherein the emergency lighting unit includes a transformer having two closely coupled windings constituting the primary of the transformer.

(b) Description of Prior Art

Electric discharge lamp lighting fixtures consist essentially of a housing, one or more lampholders to suit the number and type of lamps employed, a ballast which serves to regulate the electric current through the lamp or lamps, and in some instances a transparent or translucent diffuser. A typical fixture would be equipped with two fluorescent lamps, each four feet long, although other types of lamps are available.

An emergency lighting unit for use with such a lighting fixture consists of a rechargeable electric storage battery, a battery charging means, a transfer circuit including means for sensing the onset of a power failure, and a dc to ac inverter to provide alternating current at a voltage suitable for maintaining the electric discharge lamp lit during the power failure. In operation, the battery is normally kept in the fully charged condition by the battery charging circuit, using power derived from the electric supply line. When a power failure occurs, the transfer circuit senses this condition and is activated so as to energize the inverter, the dc input circuit of which is then connected to the battery, and the ac output circuit is connected to the lamp to be maintained.

Such emergency lighting units require the connection of at least four wires between the unit and the electrical circuits in the lighting fixture. Two of these wires are required for connection to the ac electric line power supply (for the purpose of feeding the battery charger) and at least two additional wires are required to connect the output circuit of the inverter to the lamp to be maintained.

Some emergency lighting units are designed for installation inside the lighting fixture. With such units, it is necessary to partially dismantle the lighting fixture in order to mount the emergency lighting unit inside it, and to make the various electrical wiring connections. A typical such unit designed for mounting inside a lighting fixture is described in my Canadian Pat. No. 887,282, issued Nov. 30, 1971.

Other types of emergency lighting units are designed for mounting outside the housing of the lighting fixture. One particular example of this type consists of a tubular housing, containing the battery, battery charger, transfer circuit and inverter, equipped with a lamp socket at one end and with two contact pins suitable for insertion in a lamp socket at the other end. The length of the tubular housing is twelve inches, and it can be mounted, in tandem with a three-foot long fluorescent lamp in the space previously occupied by a four-foot lamp in a fluorescent lighting fixture. Wire leads emanating from the emergency lighting unit must be connected, through a hole or holes drilled in the housing of the lighting fixture, to make the required electrical connections to operate the unit.

Both the in-fixture and the external emergency lighting units described above suffer from the disadvantage of requiring wiring connections between the unit and the components inside the lighting fixture. The necessity for these wiring connections means that the services of a qualified electrician for a considerable period of time are required, which results in considerable cost for installing the emergency lighting unit. Furthermore, if it is desired to move the emergency lighting unit from one lighting fixture to another then additional time and expense are involved.

SUMMARY OF INVENTION

The object of my invention is to provide an emergency lighting unit which can be installed without having to employ the services of a qualified electrician, with which no wires have to be connected, and which can readily be removed and re-installed.

In accordance with a specific embodiment of the invention there is provided, for use with an electric discharge lamp in a fixture, said lamp having a first input terminal and a second input terminal; an emergency lighting unit comprising: a transformer, having two closely coupled windings constituting the primary of said transformer, and a secondary winding; first adjacent ends of said coupled windings comprising the input of said emergency lighting unit, and second adjacent ends of said coupled windings comprising the output terminals of said emergency lighting unit; said input terminals being adapted to be connected to a source of ac power; said output terminals being adapted to be connected to respective ones of said first and second input terminals; rectifier means connected across the output of said secondary winding; rechargeable battery means connected across the output of said rectifier means and being rechargeable by the dc output thereof; inverter means connected in parallel with said battery means and adaptable to convert the dc output of said battery means to an ac signal; and means for sensing a loss of ac power from said source of ac power and to, upon such sensing, connecting said inverter in circuit with said input terminals.

In accordance with a further embodiment of the invention there is provided, for use with a fluorescent fixture having a lamp with a filament having first and second ends, and a ballast including a filament winding having first and second ends; an emergency lighting unit comprising: a transformer having a first winding and a second winding, said first and second winding being closely coupled, each of said first and second windings having a first end and a second end; first conductor means connecting the first end of said filament wire to the first end of said first winding; second conductor means connecting the second end of said filament winding to the first end of said second winding; third conductor means connecting the second end of said first winding to the first end of said filament; fourth conductor means connecting the second end of said second winding to the second end of said filament; rectifier means connected across the output of said secondary windings; rechargeable battery means connected across the output of said rectifier means and being rechargeable by the dc output thereof; inverter means connected in parallel with said battery means and adaptable to convert the dc output of said battery means to an ac signal; and means for sensing a loss of ac power from said source of ac power and to, upon such sensing, connecting said inverter in circuit with said filament.

In order to achieve this object, new circuits are provided in my invention to eliminate the necessity for making electrical wiring connections to points inside the housing of the lighting fixture.

BRIEF DESCRIPTION OF DRAWINGS

The invention will be better understood by an examination of the following description together with the accompanying drawings in which:

FIG. 3b is a bottom view of the lampholder of FIG. 3a;

DESCRIPTION OF PREFERRED EMBODIMENTS

Figure 1:
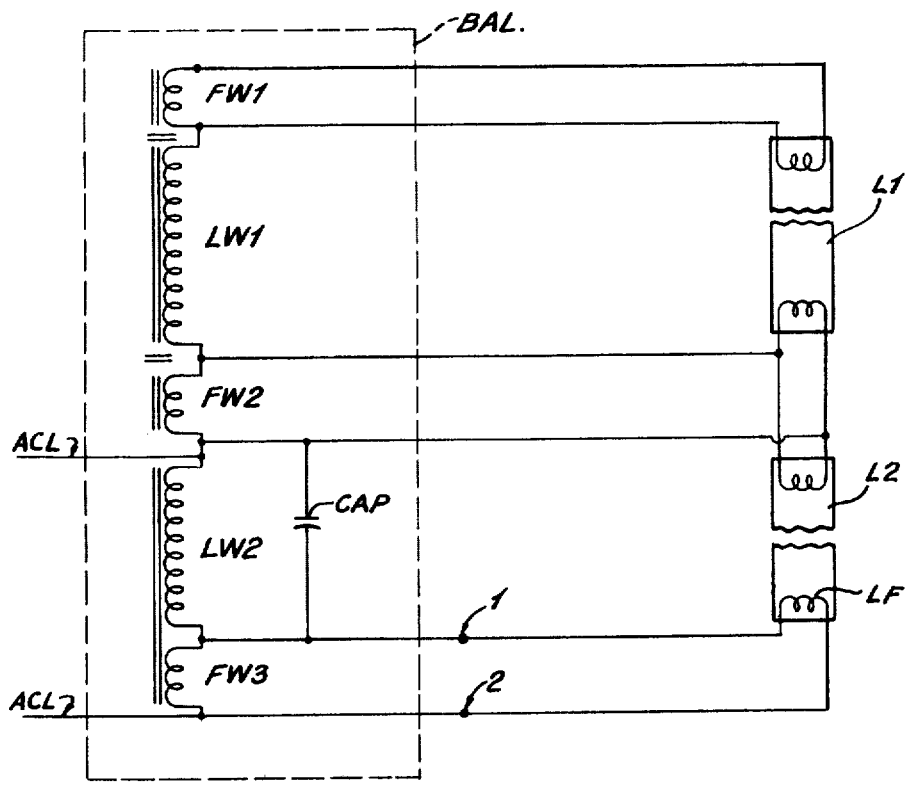
FIG. 1 is a schematic diagram of a typical two-lamp fluorescent fixture.

FIG. 1 shows a schematic diagram of a typical two-lamp fluorescent fixture. The ballast, BAL, receives ac line electrical power through two input leads, ACL. The output of the ballast appears across three filament windings, FW1, FW2 and FW3 which deliver approximately three volts. In addition, two lamp windings, LW1 and LW2 provide sufficient voltage to drive a regulated current of approximately 435 milliamps through each of the two lamps, L1 and L2. A capacitor, CAP, connected in parallel with lamp winding LW2, assists in starting the lamps when power is applied to the ballast. Referring specifically to filament winding FW3 and to its associated filament LF in lamp L2, it will be readily apparent that the conductors between FW3 and LF, which are indicated as 1 and 2, carry two currents—the first being the filament current provided by FW3, and the second being the lamp discharge current provided by LW2. It will also be apparent that the filament current flowing through point 1 will be flowing in the opposite direction through point 2. On the other hand, the lamp discharge current passing through lamp L2 will partially flow through point 1 and partially through point 2, both currents being in the same direction.

Power for charging the battery of an emergency lighting unit can be obtained from the lamp discharge current passing through points 1 and 2, provided that the flow of filament current through these same points is not impeded. If the filament current were impeded to any substantial extent, the lamps in the lighting fixture would fail to start or their life would be adversely affected.

Figure 2:
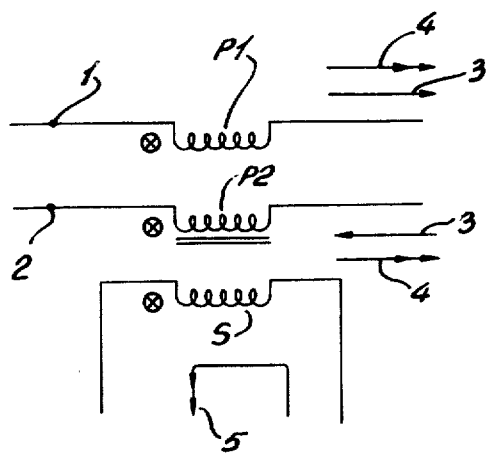
FIG. 2 illustrates a specially wound transformer in accordance with the invention.

In my invention, a specially-wound transformer is used to extract a current proportional to the lamp discharge current without adversely affecting the flow of filament current. The windings of this transformer, which has a conventional iron core, are shown in FIG. 2, in which arrows 3 indicate the instantaneous direction of filament current, and arrows 4 indicate the instantaneous direction of lamp discharge current. The two primary windings of the transformer, P1 and P2 are wound in the directions indicated by the polarity marks, and are closely coupled by being wound bi-filarly so as to minimize their mutual leakage reactance. A secondary winding, S, is wound on top of the primary windings. The filament current flows through the two primary windings in such directions that it causes no change in magnetic flux in the transformer core; therefore it induces no voltage in the secondary winding and flows unimpeded. The lamp discharge current, as indicated by arrows 4 induces a corresponding secondary current, the magnitude of which can be adjusted by selection of the turns ratio of the transformer, in the secondary winding, S, as indicated by the arrow 5. It is this secondary current, 5 that is used in my invention to charge the battery.

Figure 3A:
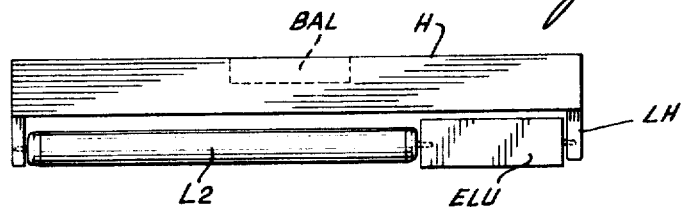
FIG. 3a is a section through IIIA—IIIA of FIG. 3b.
Figure 3B:
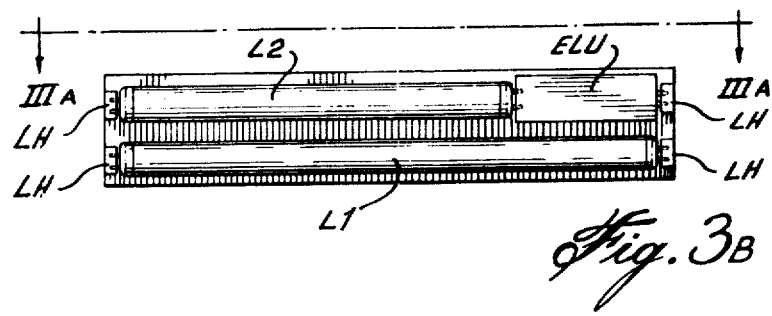

One possible method of inserting the circuitry of an emergency lighting unit into the path between the ballast of a fluorescent lighting fixture and the lamp filament terminals without the need for connecting wires to the interior of the fixture is illustrated in FIG. 3. This shows two views of a two-lamp fluorescent lighting fixture consisting of a housing, H, containing a ballast, BAL, wired to four lampholders, LH. Between two of the lampholders is fluorescent lamp, L1, having a length equal to the full spacing between the lampholders. In between the other two lampholders are mounted a shorter fluorescent lamp, L2 and the emergency lighting unit of my invention, ELU, in tandem, their combined length being sufficient to occupy the total distance between the lampholders. The emergency lighting unit, ELU is equipped with a socket at one end, adapted to receive the two pins of the fluorescent lamp L2, and at the other end, the emergency lighting unit is provided with two pins, of the same dimensions and spacing as the pins of a fluorescent lamp, which are received by the lampholder. Inside the emergency lighting unit, ELU, are mounted the battery, the special transformer described above, and an inverter the whole forming a complete emergency lighting unit capable of installation on the lighting fixture without the necessity of connecting any wires at all.

Figure 4:
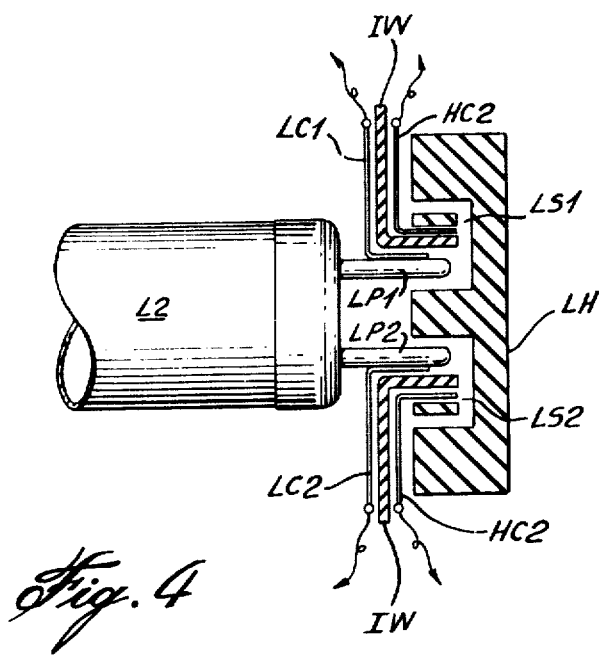
FIG. 4 illustrates an alternative method of connecting the emergency lighting unit in accordance with the invention.

Another possible method of applying the principles of my invention is illustrated in FIG. 4 which shows an adaptor that can be used in conjunction with a fluorescent lamp that extends the full distance between the lampholders of a fluorescent lighting fixture. Referring to FIG. 4, LH is a cross-section of the body of the lampholder at one end of the lighting fixture. This contains two contacts LS1 and LS2 which are connected to the ballast inside the fixture. L2 is the end of a fluorescent lamp, equipped with two pins, LP1 and LP2. A thin insulating washer, IW, made of plastic or similar insulating material, having a central hole from which two lugs protrude normal to the plane of the washer, occupies the space between the lamp, L2 and the lampholder, LH. Attached to the insulating washer, IW, are two pairs of metal contacts. The first pair of contacts, LC1 and LC2 makes electrical contact with the pins, LP1 and LP2 respectively of the fluorescent lamp L2. The second pair of contacts, HC1 and HC2, makes electrical contact with the lampholder contacts, LS1 and LS2. The four contacts LC and HC are connected to a four-conductor flexible cable, the other end of which can either be permanently connected to the housing of the emergency lighting unit, or to a four-pin plug that can be easily inserted in the emergency lighting unit. In this manner, an emergency lighting unit can be applied to the lighting fixture without the necessity for making any electrical connections to the interior of the fixture and without requiring the services of a qualified electrician.

The special transformer described above, together with the other components required to form a complete emergency lighting unit can be accommodated within the housing of the unit in any suitable arrangement to suit the internal wiring connections. The electrical circuits employed to provide the transfer circuit, and the inverter and for the battery charger can be of practically any type and will be familiar to those skilled in the art. A typical block schematic diagram of one method of connection is shown in FIG. 5.

Figure 5:
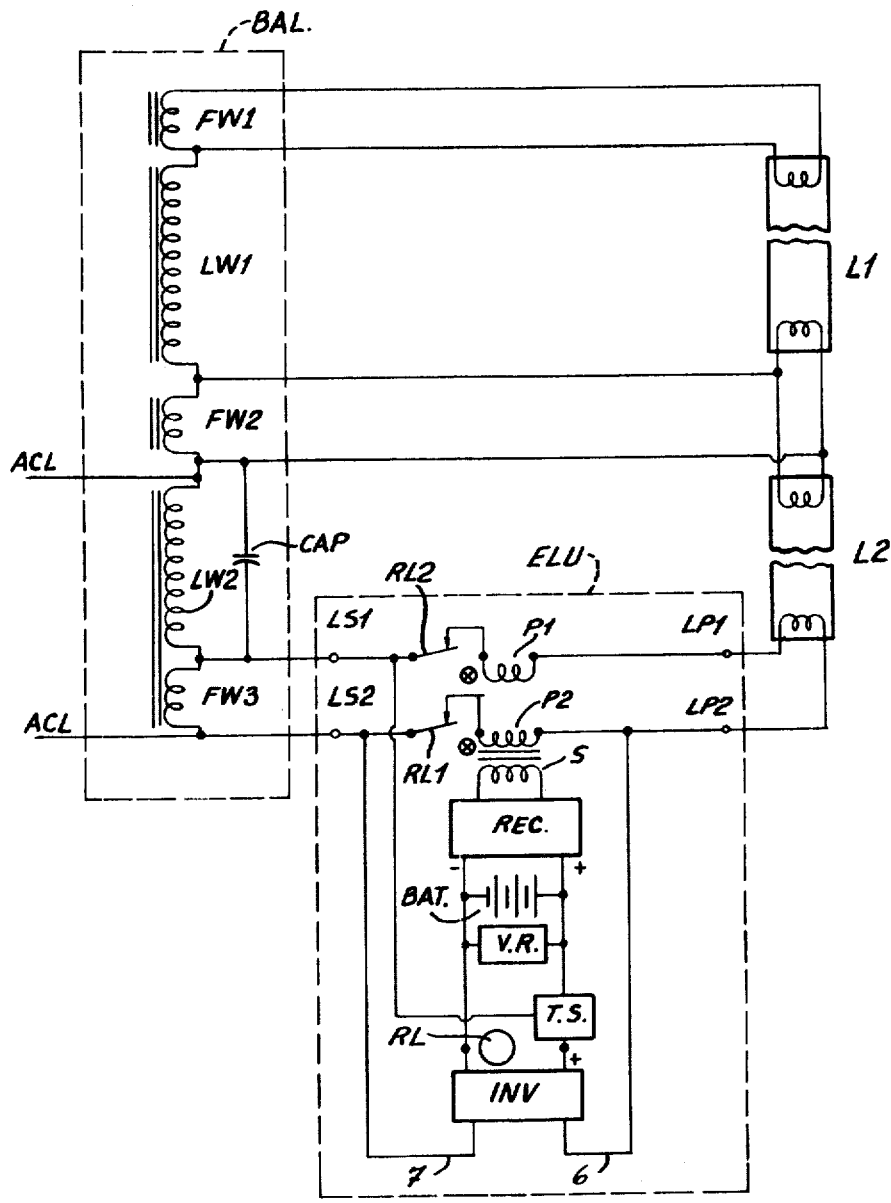
FIG. 5 is a typical block schematic diagram of one implementation of the invention.

Referring to FIG. 5, the secondary winding of the special transformer, S is connected to a rectifier, REC. The dc output of the rectifier is connected in parallel with the battery, BAT. If the battery is of a type requiring a voltage-limited charge, then a shunt voltage regulating circuit, VR is also connected in parallel with the battery to by-pass the current delivered by the secondary winding S when the battery voltage has reached a level indicating a fully-charged state. This would be the case, for example, with a sealed lead-acid battery. If the battery is of a type that will permanently withstand continuous charging, as for example, with a nickel-cadmium battery, then the voltage regulator, VR can be omitted. One lead of the battery is connected to a transfer switching circuit, TS, that serves to connect the battery to the inverter circuit, INV, when the ac voltage across filament winding FW3 disappears as a result of a power failure. Connected in parallel with the inverter is the coil of a relay, RL, whose normally closed contacts, RL1 and RL2 are in series with the leads between the filament winding, FW3 and the lamp filament, LF.

The operation of the circuit shown in FIG. 5 is described as follows: In normal operation, i.e. when the electric power supply to the lighting fixture is available, the relay is in the de-energized condition, its contacts are closed, and the lamps operate normally. A current proportional to the lamp discharge current flows through the secondary winding S of the special transformer, is rectified and charges the battery (regulated by the voltage regulator, VR, if fitted). The transfer switching circuit, TS, which may be either a relay, an additional contact on the relay RL or an electronic switching circuit, holds the circuit between the battery and the inverter open, so that the inverter is inoperative.

When a power failure occurs, voltage disappears from filament winding FW3. This causes the transfer switching circuit to operate, connecting the inverter to the battery, and energizing the relay, whose contacts open. The ac output of the inverter, appearing across points 6 and 7 feeds the lamp L2 from point 6 and returns via the capacitor, CAP, in the ballast to point 7, thus maintaining the lamp alight to give emergency illumination for the duration of the power failure.

In the foregoing descriptions reference has been made to fluorescent lighting fixtures employing lamps having filaments for the purposes of illustration of the principles of my invention. However, its applications are not limited to such types of lamp, and the principles described can equally well be employed to lighting fixtures for fluorescent lamps which do not have filaments (often known as "instant start" types) and also to other types of electric discharge lamp such as mercury vapour and sodium vapour types. For applications in which the lighting fixture accommodates lamps having bayonet or screw bases, the same principles apply, and the construction of an enclosure to engage with such lamps and lampholders can readily be envisaged.

Thus, an emergency lighting unit has been described which can be installed on a lighting fixture employing electric discharge lamps without requiring the connection of wires to parts inside the fixture and which can be installed without the necessity for the services of a qualified electrician.

Although specific embodiments have been described above, this was for the purpose of illustrating, but not limiting, the invention. Various modifications, which will come readily to the mind of one skilled in the art, are within the scope of the invention as defined in the appended claims.

I claim:

1. For use with an electric discharge lamp in a fixture, said lamp having a first input terminal and a second input terminal;

an emergency lighting unit comprising:

a transformer, having two closely coupled windings constituting the primary of said transformer, and a secondary winding, first adjacent ends of said coupled windings comprising the input of said emergency lighting unit, and second adjacent ends of said coupled windings comprising the output terminals of said emergency lighting unit;

said input terminals of said emergency lighting unit being adapted to be connected to a source of ac power;

said output terminals of said emergency lighting unit being adapted to be connected to respective ones of said first and second input terminals of said lamp;

whereby each one of said closely coupled windings is in a different line between said source of ac power and a respective one of said first and second input terminals of said lamp;

rectifier means connected across the output of said secondary winding;

rechargeable battery means connected across the output of said rectifier means and being rechargeable by the dc output thereof;

inverter means connected in parallel with said battery means and adaptable to convert the dc output of said battery means to an ac signal; and means for sensing a loss of ac power from said source of ac power and to, upon such sensing, connecting said inverter in circuit with said input terminals.

2. An emergency lighting unit as defined in claim 1 and further comprising a voltage regulator connected in parallel with said rectifier means.

3. An emergency lighting unit as defined in claim 2 wherein said lamp comprises a filament connected to said first and second input terminals at respective ends thereof, and wherein said fixture comprises a ballast having a filament winding with first and second ends;

said filament winding being connected across said ac source;

the first and second ends of said filament winding being connected to respective ones of said output terminals.

4. For use with a fluorescent fixture having a lamp with a filament having first and second ends, and a ballast including a filament winding having first and second ends;

an emergency lighting unit comprising:

a transformer having a first winding and a second winding, said first and second winding being closely coupled, each of said first and second windings having a first end and a second end;

first conductor means connecting the first end of said filament wire to the first end of said first winding;

second conductor means connecting the second end of said filament winding to the first end of said second winding;

third conductor means connecting the second end of said first winding to the first end of said filament;

fourth conductor means connecting the second end of said second winding to the second end of said filament;

rectifier means connected across the output of said secondary windings;

rechargeable battery means connected across the output of said rectifier means and being rechargeable by the dc output thereof;

inverter means connected in parallel with said battery means and adaptable to convert the dc output of said battery means to an ac signal; and means for sensing a loss of ac power from said source of ac power and to, upon such sensing, connecting said inverter in circuit with said filament.

5. An emergency lighting unit as defined in claim 4 and further comprising normally closed relay means adapted to be activated by said means for sensing a loss of ac power;

a first contact of said relay means in said first conductor;

a second contact of said relay means in said second conductor;

whereby, during a loss of ac power from said source of ac power, said relay contacts open to remove said transformer from circuit.

6. An emergency lighting unit as defined in claim 5 wherein said ballast further comprises a lamp winding in series with said filament winding; and capacitor means connected in parallel with said lamp winding.

* * * * *